United States Patent Office 3,752,799
Patented Aug. 14, 1973

3,752,799
N$^\alpha$-ACETYL-2-O-METHYLTYROSINE-OXYTOCIN
Karel Jost, Vladimir Pliska, Ivan Krejci, and Frantisek Sorm, Prague, Czechoslovakia, assignors to Ceskoslovenska Akademie Ved, Prague, Czechoslovakia
No Drawing. Filed May 20, 1970, Ser. No. 39,169
Claims priority, application Czechoslovakia, June 4, 1969, 3,973/69
Int. Cl. C07c 103/52; C07g 7/00; C08h 1/00
U.S. Cl. 260—112.5         1 Claim

ABSTRACT OF THE DISCLOSURE

N$^\alpha$-acetyl-2-O-methyltyrosine-oxytocin having uterine contraction inhibitory activity and process of preparing the same by reaction of 2-O-methyltyrosine-oxytocin with an ester of acetic acid.

---

This invention relates to N$^\alpha$-acetyl-2-O-methyltyrosine-oxytocin and to a method of preparing and using the same.

Two analogs of oxytocin characterized by inhibitory activity in vivo have already been prepared and namely, 1-penicillamine-oxytocin and N$^\alpha$-carbamyl-2-O-methyltyrosine-oxytocin. The synthesis of these compounds is however carried out only with great difficulty. In the case of the 1-penicillamine-oxytocin, a synthetic, not readily available amino acid is required as the starting material. In the case of N$^\alpha$-carbamyl-2-O-methyltyrosine-oxytocin, the last stage of the synthesis is particularly difficult to carry out and namely the step of oxidative cyclisation the disulfhydryl derivative to the disulfide.

Further, it has been established by pharmacological tests using the penicillamine analogs carried out in rats, that the use of these compounds is accompanied by a blood pressure drop which in clinical application could prove very dangerous. In comparison, experiments carried out with the novel compound in accordance with the invention and the known analogs, the latter in in vivo tests were found to have one-third the inhibitory activity of the uterotonic effects of oxytocin. Still further, the administration of N$^\alpha$-carbamyl-2-O-methyltyrosine-oxytocin in the rat in some cases was accompanied by hemoglobinuria of unknown origin.

In accordance with the invention, there has now been prepared a novel analog of the naturally occurring hormone oxytocin, both the free functional groups of which are substituted as follows: the cysteine α-amino group at the 1-position of the oxytocin compound is acylated with an acetyl group and the hydrogen of the tyrosine hydroxyl function at the 2-position is substituted with a methyl group.

The novel oxytocin analog in accordance with the invention is designated N$^\alpha$-acetyl-2-O-methyltyrosine-oxytocin and corresponds to the following formula:

(I)
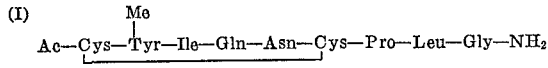

The novel oxytocin analog as shown in Formula I exhibits marked inhibitory activity in vitro and as well in vivo, making it highly suitable for use in clinical practise.

The novel N$^\alpha$-acetyl-2-O-methyltyrosine-oxytocin compound of the invention which is characterized by inhibitory properties can be prepared by reacting 2-O-methyltyrosine-oxytocin having the following formula:

(II)
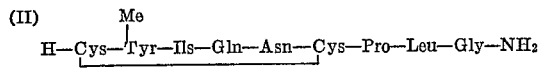

with an active ester of acetic acid and preferably with 5-chloro-8-acetoxyquinoline, acetic acid anhydride or acetyl halide.

Thus, the novel oxytocin analog of the invention is prepared in a very simple manner from the readily available methyloxytocin (2-O-methyltyrosine-oxytocin) by reaction of the same with a suitable acylating agent and preferably 5-chloro-8-acetoxyquinoline, acetic anhydride or acetyl halide.

The novel N$^\alpha$-acetyl-2-O-methyltyrosine-oxytocin does not exhibit any uterotonic activity on isolated rat uterus under the standard conditions as used in the determination of oxytocin activity (0.5 mM. Ca$^{++}$, 25° C., isometric or isotonic recording of contractions), but does show inhibitory activity when introduced in a concentration of fifteen to thirty fold that of oxytocin into the infusion solution 3–4 minutes before the addition of the oxytocin dose. A competitive type of inhibition is most probably involved as is suggested by the parallel shift of the oxytocin activity curve in the presence of the novel analog as disclosed in the instant application.

In the rat uterus in vivo (estrus or proestrus), 50 µg. doses of N$^\alpha$-acetyl-2-O-methyltyrosine-oxytocin brought about a 5–10 minute suppression of contractions due to the infusion of oxytocin (1–2 international units per hour). A 50% decrease of the uterine tonus and simultaneously of the contractions thereof was brought about when the infusion dose of the novel analog was seven to twelve times higher than that of the oxytocin and a complete inhibition of oxytocin was observed with when the dose ratio amounted to 15:1 to 20:1. A complete restoration of the oxytocin activity following disappearance of the analog takes place when the administration was carried out with a single dose (no tachyphylaxis is observed). The novel analog does not affect the spontaneous uterine activities.

Because of its inhibitory effects on the uterus, N$^\alpha$-acetyl-2-O-methyltyrosine-oxytocin is suitable for use as a therapeutic agent in obstetrical practise, particularly in the case of abortus iminens, partus prematurus iminens, tetania uteri, and also for counteracting very strong uterine contractions during childbirth.

The invention is illustrated by the following examples, but is not limited thereto.

EXAMPLE 1

A solution of 2-O-methyltyrosine-oxytocin (100 mg.; Formula II) in dimethylformamide (0.5 ml.) was reacted with 5-chloro-8-acetoxyquinoline (65.1 mg.). The reaction mixture was allowed to stand at 0° C. for 60 hours, and then diluted with ether (25 ml.). The precipitate which formed was collected and dried (yield, 89.4 mg.). The solid material was then dissolved in a pyridine acetate buffer (2 ml.). The resulting solution was filtered through a 1.4 x 40 cm. column of CM-Sephadex (100–270 mesh, 4.5 meq./g.) in a pyridine acetate buffer (pH 6.5; flow-rate, 15 ml./hour). The eluate containing the acylated peptide was concentrated to a small volume, and the resulting solution filtered through a 1.2 x 104 cm. column of Bio-Gel P4 in 1 M acetic acid (flow-rate, 8 ml./hour). Fractions (1.8 ml. each) corresponding to the monomer of the acylated peptide were combined, concentrated to a small volume, and freeze-dried. There were recovered 57 mg. (57%) of N$^\alpha$-acetyl-2-O-methyltyrosine-oxytocin (Formula I), $[\alpha]_D = -87.0°$ (c. 0.316, in 1 M acetic acid), which was electrophoretically and also chromatographically homogeneous. R$_F$ values: 0.50 in 4:1:1 n-butyl alcohol-acetic acid-water; 0.72 in 15:10:3:6 n-butyl alcohol-pyridine-acetic acid-water), and 0.29 in 75:13.5:11.5 sec-butyl alcohol-90% aqueous formic acid-water. Amino acid analysis (hydrolysis with 6 M HCl, 20 hours): Asp 1.00, Glu 1.00, Pro 0.92, Gly 0.96, Cys 1.1, Ile 0.92, Leu 1.00, Tyr 0.68, Tyr (Me) 0.28. The analytical sample was dried over phosphorus pentoxide at 1 mm. Hg for 24 hours (loss of weight, 6.2%). For $C_{46}H_{70}N_{12}O_{13}S_2 \cdot 3H_2O$ (1117.2) calculated (percent): C, 49.45; H, 6.68; N, 15.05. Found (percent): C, 49.50; H, 6.96; N, 14.43.

EXAMPLE 2

Acetic anhydride (6.0 mg.) was added to a solution of 2-O-methyltyrosine-oxytocin (20 mg.; Formula II) in dimethylformamide (0.1 ml.). The reaction mixture was allowed to stand at 0° C. for 60 hours, and then was diluted with ether (10 ml.). The precipitate which formed was collected, dried, and purified in the same manner as described in Example 1. The yield amounted to 10 mg. (50%) of $N^\alpha$-acetyl - 2 - O - methyltyrosine-oxytocin (Formula I) which was chromatographically as well as electrophoretically homogeneous and identical with the material obtained in Example 1. Amino acid analysis: Asp 1.09, Glu 1.05, Pro 1.05, Gly 1.00, Cys 0.92, Ile 0.95, Leu 1.01, Tyr 0.65, Tyr (Me) 0.23.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be protected by Letters Patent is set forth in the appended claim.

1. $N^\alpha$-acetyl-2-O-methyltyrosin-oxytocin, all aminoacid residues except glycin being in the L-configuration.

References Cited
FOREIGN PATENTS 1,500,968  10/1967  France _____ 260—112.5

OTHER REFERENCES

Smyth, J. Biol. Chem., 242, 1592–1598 (1967).
Bisset et al., Nature 218, 197–199 (1968).
Chimiak et al., Coll. Czech. Chem. Commun. 33, 2918–2966 (1968).
Boissonnas et al., Experientia 17, 389–390 (1961).
Berankova et al., Coll. Czech. Chem. Commun. 26, 2673–2675 (1961).
Rudinger et al., Protein Polypeptide Hormones, Proc. Int. Symp. 1968, Excerpta Medica Foundation, Amsterdam (1969), pp. 217–218.
Studer, J. Biol. Chem. 238, 657–659 (1963).

LEWIS GOTTS, Primary Examiner

R. J. SUYAT, Assistant Examiner

U.S. Cl. X.R.

424—177